(12) United States Patent
Ohtsubo et al.

(10) Patent No.: US 11,247,639 B2
(45) Date of Patent: Feb. 15, 2022

(54) WIPER BLADE RUBBER

(71) Applicant: FUKOKU CO., LTD., Ageo (JP)

(72) Inventors: Shuichi Ohtsubo, Saitama (JP);
Yasuyuki Okamoto, Saitama (JP);
Kazuki Kawashima, Saitama (JP);
Masaki Sakurai, Saitama (JP); Hiroaki Ohsako, Saitama (JP)

(73) Assignee: FUKOKU CO., LTD., Ageo (JP)

( * ) Notice: Subject to any disclaimer, the term of this patent is extended or adjusted under 35 U.S.C. 154(b) by 391 days.

(21) Appl. No.: 16/323,752

(22) PCT Filed: Jul. 7, 2017

(86) PCT No.: PCT/JP2017/024897
§ 371 (c)(1),
(2) Date: Feb. 6, 2019

(87) PCT Pub. No.: WO2018/030046
PCT Pub. Date: Feb. 15, 2018

(65) Prior Publication Data
US 2019/0168717 A1    Jun. 6, 2019

(30) Foreign Application Priority Data

Aug. 9, 2016    (JP) .............................. JP2016-156231

(51) Int. Cl.
*B60S 1/38*    (2006.01)
*C09D 201/00*    (2006.01)
(Continued)

(52) U.S. Cl.
CPC ................. *B60S 1/38* (2013.01); *C08J 7/042* (2013.01); *C08J 7/043* (2020.01); *C08J 7/046* (2020.01);
(Continued)

(58) Field of Classification Search
CPC ......... C08J 7/0427; C08J 7/043; C08J 7/042; C08J 7/046; C08J 2307/00; C08J 2321/00;
(Continued)

(56) References Cited

U.S. PATENT DOCUMENTS

| | | |
|---|---|---|
| 2003/0087767 A1 | 5/2003 | Goto et al. |
| 2013/0283559 A1 | 10/2013 | Braun et al. |
| 2016/0272158 A1 | 9/2016 | Okamoto et al. |

FOREIGN PATENT DOCUMENTS

| | | |
|---|---|---|
| JP | H04046849 A | 2/1992 |
| JP | 3821634 B2 | 9/2006 |

(Continued)

OTHER PUBLICATIONS

International Search Report (ISR) dated Sep. 19, 2017 issued in International Application No. PCT/JP2017/024897.
(Continued)

*Primary Examiner* — Vishal V Vasisth
(74) *Attorney, Agent, or Firm* — Holtz, Holtz & Volek PC

(57) ABSTRACT

Provided is a wiper blade rubber which has excellent wiping properties and low friction properties with respect to both clean glass surfaces and glass surfaces that have been subjected to a water repellent treatment, and which maintains these properties for a long period of time. A wiper blade rubber which has a lip part wherein a coating layer is provided on a rubber substrate by (a) applying a first coating agent onto a part of the surface of the rubber substrate, (b) curing a first coating layer by heating the rubber substrate onto which the first coating agent is applied, (c) applying a second coating agent onto the surface of the rubber substrate which has the cured first coating layer and (d) drying the second coating agent. The present invention enables the achievement of a wiper blade rubber wherein: the coating layer contains the first coating layer and the second coating layer; and the first coating layer is affixed to a part of the (Continued)

rubber substrate and the second coating layer is affixed to another part of the rubber substrate in the lip part.

6 Claims, 1 Drawing Sheet

(51) Int. Cl.
    *C09D 5/00* (2006.01)
    *C08J 7/04* (2020.01)
    *C10M 103/02* (2006.01)
    *C08K 3/04* (2006.01)
    *C08J 7/043* (2020.01)
    *C08J 7/046* (2020.01)

(52) U.S. Cl.
    CPC ............... *C08J 7/0427* (2020.01); *C08K 3/04* (2013.01); *C09D 5/00* (2013.01); *C09D 201/00* (2013.01); *C10M 103/02* (2013.01); *B60S 2001/3829* (2013.01); *C08J 2307/00* (2013.01); *C08J 2311/00* (2013.01); *C08J 2321/00* (2013.01); *C08J 2475/04* (2013.01)

(58) Field of Classification Search
    CPC ............. C08J 2475/04; C08J 2311/00; C10M 103/02; C08K 3/04; C09D 201/00; C09D 5/00; B60S 1/38
    See application file for complete search history.

(56) References Cited

FOREIGN PATENT DOCUMENTS

| | | |
|---|---|---|
| JP | 2010535268 A | 11/2010 |
| JP | 2014506847 A | 3/2014 |
| WO | 2009019112 A1 | 2/2009 |
| WO | 2015080202 A1 | 6/2015 |

OTHER PUBLICATIONS

Written Opinion dated Sep. 19, 2017 issued in International Application No. PCT/JP2017/024897.

WIPER BLADE RUBBER

This application is a 371 of PCT/JP2017/024897, filed Jul. 7, 2017.

TECHNICAL FIELD

The present invention relates to a wiper blade rubber for use in wipers for machines such as transport machines, and industrial machines and instruments.

BACKGROUND ART

Wipers are sliding members conventionally used in transport machines such as vehicles, aircrafts and ships, and industrial machines and instruments such as construction machines, for the purpose of wiping off water and fine particles adhering to smooth surfaces such as glass to ensure visibility for the operator.

Wiper blade rubbers are generally fitted to the sliding parts of the wipers. For example, an automobile windshield wiper has a wiper blade rubber which removes rainwater, snow, dust, mud and the like off the glass surface in association with the driving of the wiper, thus ensuring visibility for the driver. Some of the requirements for wiper blade rubbers are excellent durability as well as a small friction coefficient with glass and wiping performance good enough to remove water droplets, dirt and the like sufficiently.

Rubbers and other materials such as resin elastomers are generally used as the base materials of wiper blade rubbers. To reduce the wear of wiper blade rubbers, it is preferable to lessen the friction between the wiper blade rubber and the surface that is wiped (glass surface). Thus, a coating layer is conventionally formed on the surface of the base material that will contact glass, to reduce the friction between the base material and the glass during sliding of the wiper blade.

In a conventional wiper blade rubber, a coating layer is formed by coating a solid lubricant onto the surface of a base material. Although such a wiper blade rubber can attain low friction at an initial stage of use, the coating layer is gradually worn or comes off during long use to expose the base material having high frictional properties. Thus, it is difficult to maintain low friction over a long time.

The present inventors have studied in detail in order to solve the above problem and have found the following. A coating layer which has a high elastic modulus and is relatively hard tends to be worn by repeated sliding on the glass surface, and thus it is difficult to maintain the wiping performance over a long time. Further, when a coating layer has a high elastic modulus and is hard, the followability to a curved glass surface such as an automobile windshield is degraded, and it becomes difficult to suppress the occurrence of problems such as irregular wiping. However, when a wiper blade rubber having a small elastic modulus and a soft coating layer are provided in order to improve followability to the glass surface, the wiper blade rubber itself is stuck to the glass surface and the friction coefficient at the start of sliding becomes high.

Also in recent years, glass surfaces such as those in automobiles are coated with water repellents including silicone compounds or fluorine compounds in order to ensure good visibility. However, when a water-repellent agent is used, there is a problem that abrasion of the wiper blade rubber and wear of the water-repellent treated film on the glass surface progress, because the friction between the wiper blade rubber and the glass surface becomes large.

Also, in order to suppress the progress of abrasion, a wiper blade rubber made of silicone rubber can be used, but on a glass surface not subjected to water repellent treatment, a silicone component is transferred from the coating agent, and as a result, it is difficult to form a lubricating film (water film), and the wiping performance is deteriorated

CITATION LIST

Patent Literature

Patent Literature 1: Japanese Patent No. 3821634

SUMMARY OF INVENTION

Technical Problem

An object of the present invention is to provide a wiper blade rubber which exhibits low friction and high wiping performance with respect to both clean glass surfaces and water-repellent glass surfaces, and which maintains such effects over a long time.

Solution to Problem

The present invention embraces the following.

[1] A wiper blade rubber comprising a rubber base material and a coating layer on a lip portion of the rubber base material, wherein
the coating layer includes a first coating layer and a second coating layer, and
in the lip portion, the first coating layer adheres to a part of the rubber base material, and the second coating layer adheres to another part of the rubber base material.

[2] The wiper blade rubber described in [1], wherein the second coating layer comprises a solid lubricant and a binder.

[3] The wiper blade rubber described in [1] or [2], wherein the second coating layer is softer than the first coating layer.

[4] The wiper blade rubber described in [2] or [3], wherein the second coating layer itself has an elastic modulus of 0.01 to 3 MPa.

[5] The wiper blade rubber described in [2] or [3], wherein the second coating layer itself has an elastic modulus of 0.01 to 2 MPa.

[6] The wiper blade rubber described in any one of [1] to [5], wherein the first coating layer itself has an elastic modulus of 2 to 20 MPa.

[7] The wiper blade rubber described in any one of [1] to [6], wherein the first coating layer itself has an elastic modulus of 2 to 6 MPa.

[8] The wiper blade rubber described in any one of [1] to [7], wherein a ratio of the area of the part of the rubber base material to which the first coating layer adheres, to the area of the part of the rubber base material to which the second coating layer adheres ranges from 30:70 to 80:20.

[9] The wiper blade rubber described in any one of [1] to [8], wherein a ratio of the area of the part of the rubber base material to which the first coating layer adheres, to the area of the part of the rubber base material to which the second coating layer adheres ranges from 40:60 to 70:30.

[10] The wiper blade rubber described in any one of [1] to [9], wherein the second coating layer has a thickness not less than ½ that of the first coating layer.

[11] The wiper blade rubber described in any one of [1] to [10], wherein the first coating layer has a thickness of 2 to 10 μm, and the second coating layer has a thickness of 1 to 15 μm.

[12] The wiper blade rubber described in any one of [2] to [11], wherein the solid lubricant contained in the second coating layer is at least one flake solid lubricant selected from the group consisting of flake graphite, flake molybdenum disulfide, flake boron nitride and flake polytetrafluoroethylene.

[13] The wiper blade rubber described in [12], wherein the flake solid lubricant has a volume-based average particle size (D50) of 1 to 10 μm as determined by a laser diffraction scattering method.

[14] The wiper blade rubber described in [12] or [13], wherein the flake solid lubricant has a volume-based average particle size (D50) of 1 to 5 μm as determined by a laser diffraction scattering method.

[15] The wiper blade rubber described in any one of [2] to [14], wherein a volume ratio of the solid lubricant to the binder in the second coating layer ranges from 1 to 20.

Advantageous Effects of Invention

According to the present invention, there is provided a wiper blade rubber which exhibits low friction and high wiping performance with respect to both clean glass surfaces and water-repellent glass surfaces, and maintains such effects over a long time.

DESCRIPTION OF EMBODIMENTS

1. Wiper Blade Rubber

First, the wiper blade rubber of the present invention will be described.

Figure 1:
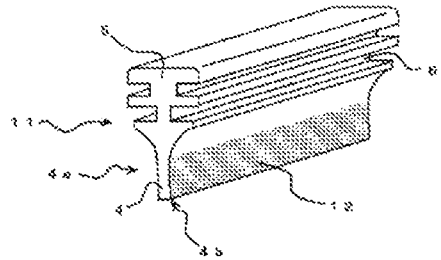
FIG. 1 is a partial perspective view illustrating an embodiment of the wiper blade rubber according to the present invention.

FIG. 1 is a partial perspective view illustrating an embodiment of the wiper blade rubber of the present invention. In FIG. 1, numeral 11 indicates a wiper blade rubber. Wiper blade rubber 11 is composed of lip portion 4 having a lip sliding part 4b that slides in contact with a glass surface, holding part 5 which will be fitted and held to a wiper blade holder (not shown) together with a vertebra (not shown), and neck part 6 which connects lip portion 4 to holding part 5. Numeral 12 indicates a surface-treated part. Surface-treated part 12 is disposed on lip lateral part 4a of lip portion 4 of wiper blade rubber 11. Then, assembling the wiper blade rubber 11 to other members, a suitable wiper device can be provided.

2. Materials

Next, the materials that constitute the wiper blade rubber will be described.

Figure 2:
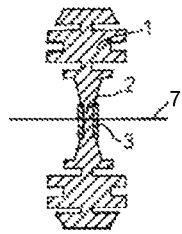
FIG. 2 is a sectional view of a tandem-shaped wiper blade rubber base material.

The wiper blade rubber is typically molded with a tandem shape as illustrated in FIG. 2, in which two wiper blade rubber base materials 1 abut together via their tips. A coating agent containing a predetermined polymer and solid lubricant is applied to both sides of constricted lip portion 2 of wiper blade rubber base materials 1, and is cured or dried to form coating layer 3 in which the solid lubricant is dispersed. Thereafter, lip portion 2 is cut along the middle (along a cutting part indicated with numeral 7 in FIG. 2). Consequently, wiper blade rubbers are produced which have coating layer 3 on both sides of lip portion 2 and show the rubber base material exposed at the end face of the lip portion.

2.1. Rubber Base Material

Examples of rubbers which can constitute the wiper blade rubber base material include natural rubber, styrene-butadiene rubber, chloroprene rubber, ethylene-propylene-diene rubber (EPDM), ethylene-propylene rubber, and mixtures of these rubbers. Resin elastomers may be used depending on use applications.

The shape of the rubber base material is not particularly limited, but preferably has a tandem cross section such as the one described above. Adopting such a shape makes it easy to cut a lip portion with a clean end, and also makes it possible to realize economically efficient production of wiper blade rubbers having on a lip portion a coating layer in which solid lubricant is dispersed.

Usually, the part of the rubber base material that will become the lip portion of the wiper blade rubber is subjected beforehand to a conventional surface treatment such as halogenation treatment. A chlorination treatment is one example of a halogenation treatment. In the chlorination treatment, at least the lip portion of wiper blade rubber is soaked into a chlorine-containing solvent to harden the surface.

At the same time, the chlorination treatment can roughen the surface to enhance the adhesion between the rubber base material and the coating layer.

2.2. Solid Lubricants

The solid lubricant is a solid material having self-lubricating properties. Known solid lubricants may be used. Examples thereof include graphite (black lead), molybdenum disulfide, tungsten disulfide, boron nitride and polytetrafluoroethylene (PTFE). Flake solid lubricants such as flake graphite, flake molybdenum disulfide, flake boron nitride and flake polytetrafluoroethylene are preferable. In particular, flake graphite is preferable.

The volume-based average particle size ($D_{50}$) of the solid lubricant measured by a laser diffraction scattering method ranges preferably from 1 to 20 μm, more preferably from 1 to 10 μm, and most preferably from 1 to 5 μm. For example, the laser diffraction scattering method may be performed using a device such as microtrack grain size distribution analyzer MT3300 (manufactured by Nikkiso Co., Ltd.). In the case where the solid lubricant is flakes, the average particle size indicates the length along the major axis. When the solid lubricant is spherical, the average particle size indicates the diameter.

2.3. Coating Layers

In the present invention, the key feature is that the wiper blade rubber is provided with a rubber base material and a coating layer formed on a lip portion of the rubber base material, wherein the coating layer includes a first coating layer and a second coating layer, and in the lip portion, the first coating layer adheres to a part of the rubber base material, and the second coating layer adheres to another part of the rubber base material.

The first coating layer preferably includes a binder, and preferably includes a solid lubricant and a binder.

The elastic modulus of the first coating layer itself ranges preferably from 2 to 20 MPa, and more preferably from 2 to 6 MPa. The thickness of the first coating layer ranges preferably from 2 to 10 μm.

The second coating layer includes a solid lubricant and a binder.

The elastic modulus of the second coating layer itself ranges preferably from 0.01 to 3 MPa, and more preferably from 0.01 to 2 MPa. The thickness of the second coating layer ranges preferably from 1 to 15 μm.

The thickness of the second coating layer is preferably not less than ½ that of the first coating layer.

Preferably, the second coating layer is softer than the first coating layer. Whether the first coating layer is "harder" and the second coating layer is "softer" may be assessed based on the magnitudes of elastic modulus of the respective layers.

The ratio of the area of the part of the rubber base material to which the first coating layer adheres, to the area of the part of the rubber base material to which the second coating layer adheres, ranges preferably 30:70 to 80:20, and more preferably 40:60 to 70:30.

Preferably, the second coating layer extends so as to reach the outer surface layer portion on the lip portion that is the top surface of the coating layer and to cover the surface together with the solid lubricant, while the first coating layer does not reach the outer surface layer portion of the lip portion.

The first binder that is used to form the first coating layer is not particularly limited. Preferably, the first binder includes a curable polymer having a capability of containing a solid lubricant dispersed therein and a capability of bonding to the rubber base material.

The second binder that is used to form the second coating layer is not particularly limited. Preferably, the second binder includes a polymer having a capability of containing a solid lubricant dispersed therein and a capability of bonding to the rubber base material. The polymer does not need to be curable or crosslinkable.

Although not wishing to be bound by theory, the mechanism may be as described below. If the first polymer is bonded to the entirety of the surface of the rubber base material that is to be treated, the resultant coating layer is so rigid that it cannot follow the deformation of wiper blade rubber under a load and breakage results. If, to the contrary, the coating layer on the treated surface of the rubber base material is formed exclusively by the second polymer, the coefficient of static friction can be held low, but any sufficient strength and durability for wiper blade rubbers cannot be expected. In view of these facts, the first coating layer is bonded only to a part of the treated surface of the rubber base material, and is thereby prevented from being broken and also serves to hold the second coating layer. It is assumed that, on account of the combination of the above two, a good coefficient of static friction can be maintained over a long time.

3. Methods for Producing Wiper Blade Rubber

Next, methods for producing the wiper blade rubber of the present invention will be described. As an example, a method including the following steps will be discussed.

(a) Step of applying a first coating agent to a part of the surface of a rubber base material, (b) Step of curing the first coating agent by heating the rubber base material to which the first coating agent is applied, (c) Step of applying a second coating agent to the surface of the rubber base material having the cured first coating layer, and (d) Step of drying the second coating agent.

(a) Step of Applying a First Coating Agent to a Part of the Surface of a Rubber Base Material The first coating agent that is used in the production of the wiper blade rubber of the invention suitably contains a solid lubricant, a binder and other components.

Such a coating agent can be produced by dispersing a predetermined binder in an aqueous medium or dissolving it in an organic solvent and then mixing an arbitrary solid lubricant. The solid lubricant may be mixed and dispersed into the binder by a known method, for example, by the use of a bead mill, a ball mill, a dissolver or the like.

The amount of the aqueous medium or organic solvent relative to the solid content in the coating agent may vary depending on the manner of using the coating agent and it is not particularly limited. The amount of the aqueous medium or organic solvent is usually selected within the range of 150 to 1200 parts by mass per 100 parts by mass of the solid content.

In the case of using a curing agent, a predetermined amount of a curing agent is added to the coating agent and mixed well immediately before coating on the wiper blade.

The details about the solid lubricants are as described hereinabove.

Examples of the first binder used in the first coating agent include, but are not limited to, the following:

Polyol polyether urethane/aromatic isocyanates such as "NIPPOLAN 3016" (trademark; manufactured by Nippon Polyurethane Industry Co., Ltd.).

Copolymers of tetrafluoroethylene, hexafluoropropylene and vinylidene fluoride, such as "THV200P" (trademark) manufactured by Sumitomo 3M Limited.

Silicone-modified urethane polyol/isophorone diisocyanates such as "TAKELAC TE-520" (trademark; manufactured by Takeda Pharmaceutical Company Limited).

BPA-type liquid epoxy/aromatic polyamides such as "ADEKA RESIN EP-4100" (trademark; manufactured by ADEKA CORPORATION).

Polyamidimides such as "HPC-5000-37" (trademark; manufactured by Hitachi Chemical Co., Ltd.).

Polyol polyether urethane/block isocyanates such as "NIPPOLAN 179P" (trademark; manufactured by Nippon Polyurethane Industry Co., Ltd.).

Acrylic polymers such as "ACRYDIC 56-1155" (trademark; manufactured by DIC CORPORATION).

Aqueous polyurethane dispersions such as "ETERNACOLL (registered trademark) UW-1501-F" (manufactured by UBE INDUSTRIES, LTD.), "ETERNACOLL (registered trademark) UW-1005-E" (manufactured by UBE INDUSTRIES, LTD.), and mixtures thereof.

Hexamethylene diisocyanate polyisocyanates such as "DURANATE E402-B80B" (trademark; manufactured by Asahi Kasei Corporation) and "DURANATE 17B-60P" (trademark; manufactured by Asahi Kasei Corporation).

The first coating agent may contain two or more kinds of first binders. In this case, the mixing ratio between the binders is not particularly limited and is desirably determined appropriately so that the cured binder will satisfy the desired properties.

Generally, use of a first binder containing a polycarbonate polyurethane resin permits increasing the amount used of solid lubricant and is able to lower the frictional coefficient of the coating layer, as compared to use of a first binder containing a polyol polyether polyurethane resin or use of a first binder containing a phenol resin and either a chloroprene rubber or a chlorosulfonated polyethylene. Even if the amount of the solid lubricant in the coating agent is increased, the adhesion between the coating layer and the rubber base material is kept good, and abrasion of the coating layer of the wiper blade can be suppressed even if it is used for a long time.

Examples of the dispersion media for dispersing the first binder include aqueous media. Examples of the solvents for dissolving the first binder include organic solvents. In consideration of such regulations as the control of emissions of VOC (volatile organic compounds) and the like, it is preferable that the first binder be used with an aqueous medium. Examples of the aqueous media include water and mixed media of water and hydrophilic organic solvents.

Examples of water include ion exchanged water, distilled water and ultrapure water. In consideration of dispersion stability and the like, ion exchanged water is preferably used.

Examples of the hydrophilic organic solvents include lower monohydric alcohols such as methanol, ethanol and propanol; polyhydric alcohols such as ethylene glycol and glycerin; and aprotic hydrophilic organic solvents such as dimethylsulfoxide, dimethylformamide, N-methylpyrrolidone and M-ethylpyrrolidone.

The amount of the hydrophilic organic solvent in the aqueous media ranges preferably from 0 to 20% by mass, and more preferably from 0 to 10% by mass based on the aqueous medium taken as 100% by mass.

Examples of the organic solvents include toluene, xylene, butyl acetate, dimethylformamide, dimethylacetamide, N-methylpyrrolidone and N-ethylpyrrolidone.

The content of the first binder in the first coating agent ranges preferably from 15 to 45% by mass, and more preferably from 20 to 40% by mass relative to the total mass (100% by mass) of the first coating agent. The viscosity of the coating agent at 20° C. ranges preferably from 10 to 200 mPa·s, and more preferably from 20 to 100 mPa·s. The viscosity of the coating agent may be measured with, for example, a tuning-fork type vibration viscometer.

In case a solid lubricant is incorporated, the volume ratio between the solid lubricant and the binder in the first coating agent (solid lubricant: binder, hereinafter P/B ratio) ranges from 0.25 to 4.25.

Additives such as fillers, surfactants, dispersants, thickeners and preservatives may be added as long as the object and advantageous effects of the present invention are not impaired.

The first coating agent prepared as described above is applied to a part of the surface of the rubber base material. The first coating agent is not applied to the entire surface so as to leave a region for the application of the second coating agent. Here, the phrase "surface of the rubber base material" indicates a region which will become a lip portion of the final wiper blade rubber and which usually has been subjected to a known surface treatment such as halogen treatment.

The first coating agent may be applied by a known method such as spray coating, knife coating, roller coating or dipping. To leave a region for the application of the second coating agent, it is preferable to adopt spray coating or coating over masking.

When the rubber base material has a tandem cross section and the first coating agent is applied to the tandem shape constricted portion, the first coating agent may be applied to both sides of the lip portion of the tandem-shaped rubber base material shown in FIG. 2 after applying the coating agent by spray application or the like, and the first coating layer may be formed by curing.

The first coating agent is applied so that the first coating layer has a desired thickness, preferably 2 to 10 μm.

(b) Step of Curing the First Coating Agent by Heating the Rubber Base Material to which the First Coating Agent is Applied Next, the first coating agent is cured to form a first coating layer.

The temperature of heating for curing the first coating agent is not particularly limited. For example, the first coating agent may be crosslinked at a temperature of 50 to 200° C. When a crosslinkable polycarbonate polyurethane resin is used, it is preferably a thermocrosslinking type polycarbonate polyurethane resin which forms a urethane crosslinked structure at a temperature of 80 to 200° C.

The means for heating may be any conventional means with no particular limitation. For example, the first coating agent can be cured by heating in a firing furnace.

(c) Step of Applying a Second Coating Agent to the Surface of the Rubber Base Material Having the Cured First Coating Layer In the manner described above, an intermediate base material is obtained which has the cured first coating layer on a part of the treated surface of the rubber base material. A second coating agent is applied to the intermediate base material.

Production of the second coating agent is the same as above, except that a second binder is used in place of the first binder.

Examples of the second binder include, but are not limited to, the following:

Polyol polyether urethane/aromatic isocyanates such as "NIPPOLAN 3016" (trademark; manufactured by Nippon Polyurethane Industry Co., Ltd.).

Copolymers of tetrafluoroethylene, hexafluoropropylene and vinylidene fluoride, such as "THV200P" (trademark) manufactured by Sumitomo 3M Limited.

Silicone-modified urethane polyol/isophorone diisocyanates such as "TAKELAC TE-520" (trademark; manufactured by Takeda Pharmaceutical Company Limited).

BPA-type liquid epoxy/aromatic polyamides such as "ADEKA RESIN EP-4100" (trademark; manufactured by ADEKA CORPORATION).

Polyamidimides such as "HPC-5000-37" (trademark; manufactured by Hitachi Chemical Co., Ltd.).

Polyol polyether urethane/block isocyanates such as "NIPPOLAN 179" (trademark; manufactured by Nippon Polyurethane Industry Co., Ltd.).

Acrylic polymers such as "ACRYDIC 56-1155" (trademark; manufactured by DIC CORPORATION).

Aqueous polyurethane dispersions such as "ETERNACOLL (registered trademark) UW-1501-F" (manufactured by UBE INDUSTRIES, LTD.), "ETERNACOLL (registered trademark) UW-1005-E" (manufactured by UBE INDUSTRIES, LTD.), and mixtures thereof.

The second coating agent may contain two or more kinds of binders. In this case, the mixing ratio between the binders is not particularly limited and is desirably determined appropriately so that the dried binder will satisfy the desired properties.

The items to be considered in the selection of the second binder(s) are the same as in the case of the first coating agent.

The same as described for the first coating agent applies to the selection and parts used of the dispersion media and solvents for dispersing the second binder, the content of the second binder in the second coating agent, the viscosity, the weight ratio of the solid content of second binder to the solid content of solid lubricant, and the use of additives such as fillers, surfactants, dispersants, thickeners and preservatives.

The volume ratio of the solid lubricant to the binder in the second coating agent (the P/B ratio) ranges from 0.5 to 20, and preferably from 1 to 20.

It is desirable that the content of the solid lubricant in the second coating agent be more than the content of the solid lubricant in the first coating agent.

The second coating agent prepared as described above is applied to the rubber base material having the cured first coating layer. Here, the second coating agent is preferably applied so as to coat the entire surface of the cured first coating layer of the intermediate base material.

The second coating agent may be applied by a known method such as spray coating, knife coating, roller coating or dipping.

The second coating agent is applied so that the second coating layer has a desired thickness, preferably not less than ½ that of the first coating layer, and more preferably a thickness of 1 to 15 μm.

(d) Step of Drying the Second Coating Agent

Next, the second coating agent is dried to form a second coating layer. The second coating agent may be or may not be cured.

The means for heating may be any conventional means with no particular limitation. For example, the second coating agent can be cured by heating in a firing furnace.

The wiper blade rubber of the present invention is thus produced.

A method of manufacturing a wiper blade rubber according to the present invention may optionally include a step (e) of cutting a rubber substrate having a constricted portion in which a first coating layer and a second coating layer are formed into two.

That is, as already described with reference to FIG. 2, two kinds of coating layers are formed on the lip portion in the constricted portion of the rubber base material in which the tips of the two wiper blade rubbers are formed in a continuous tandem shape, and then by cutting the lip at the center, it is possible to make two wiper blade rubbers with a coating film on the lip part.

EXAMPLES

Hereinbelow, the present invention will be described in detail based on Examples and Comparative Examples. It should not be understood that the invention is limited to such Examples and Comparative Examples. In the Examples and Comparative Examples, "part(s)" and "%" refer to "part(s) by mass" and "% by mass", respectively.

4.1. Methods for Evaluating Properties 4.1.1. Hardness (Indentation Elastic Modulus)

The indentation elastic modulus as a measure of the hardness of a coating layer is calculated with a loading-unloading test mode using Dynamic Ultra Micro Hardness Tester DUH-211S (manufactured by Shimadzu Corporation) under the following conditions.

Measurement conditions: 0.1 mN load
Indenter: triangular pyramid indenter, apex angle 115°, Berkovich type
Film thickness: 6 μm
Base material: Hardness 60HA (in accordance with JIS K 6251)
Testing environment: 23° C., 50% RH 4.1.2. Area Coated with Coating Layer A coating agent is applied to a chlorine-treated rubber base material. The coated face is photogrpahed with a CCD camera. By binarizing the photographed image, the coating layer is represented by white and the rubber base material is represented by black. The coated area is calculated in percentage using the following formula:

Area of white/(Area of white+ Area of black)×100    Calculation formula:

4.1.3. Thickness

Two pieces of a masking tape are attached to the lip portion of a wiper blade rubber with an interval of 5 mm. The sample was applied with a coating agent, and thereafter the masking tape is removed. The height of the coating layer from the surface of the rubber base material is measured with a laser displacement meter.

4.1.4. Wiping Sensory Evaluation

Figure 3:
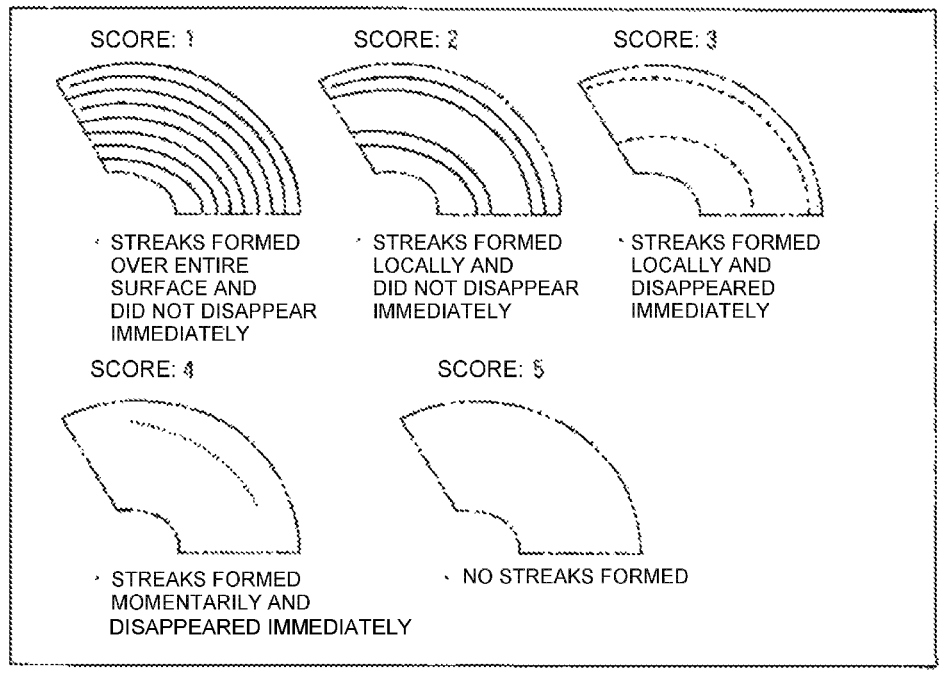
FIG. 3 is a view schematically illustrating the criteria of sensory evaluation scores.

The wiping performance was sensorially evaluated as follows. A wiper blade rubber provided with a coating layer formed with a coating agent was attached to an ordinary automobile wiper device. After that, about 100 to 500 ml of water was evenly sprayed per minute onto the window glass surface of the ordinary automobile, and the wiping operation was performed with a wiper device. The state of the streaks remaining on the outer surface of the window glass when the wiper blade rubber wiped the window glass downward was evaluated from the interior of the automobile through the window glass. The wiping performance was evaluated based on scoring criteria described later. Prior to the wiping test, the window glass surface was cleaned and the glass surface from which the wax and coating agent had been removed was made into a normal glass surface. Further, a water repellent glass surface was formed on the glass surface on which a water repellent coating film was formed using a commercially available water repellent for automobile window glass in accordance with the attached instructions. Here, as a water repellent agent, Drive Joy (registered trademark) made by TACTI CORPORATION and a commercial glass coat set (sometimes referred to as "Drive Joy repellent glass coat") were used. FIG. 3 is a view schematically illustrating the criteria of sensory evaluation scores.

Evaluation score 5: No streaks formed.
Evaluation score 4: Streaks formed momentarily and disappeared immediately.
Evaluation score 3: Streaks formed locally and disappeared immediately.
Evaluation score 2: Streaks formed locally and did not disappear immediately.
Evaluation score 1: Streaks formed over the entire surface and did not disappear immediately.

4.1.5. Coefficient of Static Friction

A cut body bench imitating an actual car is provided. A wiper is operated at a pressure of 16 g/cm and a voltage of 8 V, and the load applied to the arm at the start of the operation is measured with a strain gauge. The coefficient of static friction $\mu=P/F$ is calculated, where F is the load and P the pressure.

4.1.6. Durability Test (Frictional Coefficient)

A cut body bench imitating an actual car is provided.

Drive Joy water repellent glass coating is applied to the entire glass surface.

A wiper is operated for 1 hour while repeating a cycle consisting of 1 second of watering and 1 minute and 59 seconds of non-watering (pressure 16 g/cm, 45 wiping cycles/min). After the operation, the coefficient of static friction is calculated as described above.

4.1.7. Presence or Absence of Dirt on Glass Surface

Drive Joy water repellent glass coating is applied to a cut body bench to render the glass water-repellent. While spraying water to the water-repellent glass surface, the wiper blade is operated for 3 minutes. The presence or absence of streak-like contamination is visually checked on the area where the wiper blade is inverted on the water repellent glass surface.

4.1.8. Presence or Absence of Water Repellency on Normal Glass Surface after Durability Test While spraying water to the normal glass surface, the wiper blade is operated for 3 minutes. Thereafter, a mist of water is applied with a spray to the wiped surface of a cut body bench.

The surface is visually inspected for repelled water droplets.

4.2. Preparation of Coating Agents

The following binders were used for the preparation of first coating agents.

A: ETERNACOLL UW-1501-F (trademark; manufactured by UBE INDUSTRIES, LTD.)

C: DURANATE E402-B80B (trademark; manufactured by Asahi Kasei Corporation) 4.0 (wt %), DURANATE 17B-60P (trademark; manufactured by Asahi Kasei Corporation) 1.0 (wt %)

D: NIPPOLAN 179P (trademark; manufactured by Nippon Polyurethane Industry Co., Ltd.) 4.9 (wt %), CORONATE 2513 (trademark; manufactured by TOSOH CORPORATION) 6.1 (wt %)

The following binder was used for the preparation of second coating agent.

B: ETERNACOLL UW-1005-E (trademark; manufactured by UBE INDUSTRIES, LTD.)

As solid lubricants, flake graphite having a particle size of 1, 3.5, 10 or 20 µm, flake molybdenum having a particle size of 2 µm, and flake polytetrafluoroethylene having a particle size of 8 µm were used.

Coating agents were obtained by mixing the above materials uniformly in a usual manner using an appropriate aqueous dispersion medium or organic solvent as required.

4.3. Fabrication of Wiper Blade Rubbers

Example 1

A tandem-shaped body was molded as illustrated in FIG. 2 which was a unit of two pieces of wiper blade rubber (material: a blend of natural rubber and chloroprene rubber). The tandem-shaped body was soaked in a treatment liquid to chlorinate the surface, and then was cleaned in boiling water. Next, a first coating agent (containing 2 parts by mass of binder A, and 7 parts by mass of the flake graphite having a particle size of 3.5 µm as the solid lubricant) was applied with a spray gun onto one side of the lip portion so that the applied area was 50%. The wiper blade rubber was reversed and the first coating agent was applied onto the other side of the lip portion in a similar manner Thereafter, an intermediate base material having a first coating layer (film thickness 6 µm, hardness (modulus of elasticity) 4 MPa) cured by using a calcining furnace was obtained.

Next, a second coating agent (containing 1 part by mass of binder B, and 8.5 parts by mass of the flake graphite having a particle size of 3.5 µm as the solid lubricant) was applied onto the entire surface of one side of the lip portion of the intermediate base material with a spray gun. The intermediate base material was reversed and the second coating agent was applied onto the entire surface of the other side of the lip portion in a similar manner. The coating agent was then dried in a calcining furnace to form a second coating layer having a thickness of 9 µm.

Thereafter, the rubber base material was cut along the center of the lip portion to give two pieces of wiper blade rubber.

Examples 2 to 4

Wiper blade rubbers were obtained by repeating the procedure described in Example 1, except that the first coating agent was applied over 25%, 70% or 90% area.

Examples 5 to 8

Wiper blade rubbers were obtained by repeating the procedure described in Example 1, except that the first coating agent was applied so that the thickness of the coating layer would be 1 µm, 2 µm, 10 µm or 15 µm.

Examples 9 and 10

Wiper blade rubbers were obtained by repeating the procedure described in Example 1, except that the second coating agent was applied so that the thickness of the coating layer would be 0.5 µm or 20 µm.

Examples 11 to 13

Wiper blade rubbers were obtained by repeating the procedure described in Example 1, except that the particle size of the flake graphite added to the second coating agent was changed to 1 µm, 10 µm or 20 µm.

Examples 14 and 15

Wiper blade rubbers were obtained by repeating the procedure described in Example 1, except that the flake graphite with a particle size of 3.5 µm added to the second coating agent was replaced by either a flake molybdenum having a particle size of 2 µm or a flake polytetrafluoroethylene having a particle size of 8 µm.

Example 16

Wiper blade rubbers were obtained by repeating the procedure described in Example 1, except that the first coating agent was changed to one which contained 1 part by mass of binder D and 8.5 parts by mass of the flake graphite having a particle size of 3.5 µm as the solid lubricant.

Example 17

Wiper blade rubbers were obtained by repeating the procedure described in Example 1, except that the first coating agent was changed to one which contained 3 parts by mass of binder D and 6 parts by mass of the flake graphite having a particle size of 3.5 μm as the solid lubricant.

Example 18

Wiper blade rubbers were obtained by repeating the procedure described in Example 1, except that the first coating agent was changed to one which contained 4 parts by mass of binder C and 4 parts by mass of the flake graphite having a particle size of 3.5 μm as the solid lubricant.

Example 19

Wiper blade rubbers were obtained by repeating the procedure described in Example 1, except that the first coating agent was changed to one which contained 4 parts by mass of binder C and 2 parts by mass of the flake graphite having a particle size of 3.5 μm as the solid lubricant.

The cured first coating layers in Examples 16 to 19 showed a hardness (elastic modulus) of 1 MPa, 6 MPa, 20 MPa and 25 MPa, respectively.

Example 20

Wiper blade rubbers were obtained by repeating the procedure described in Example 1, except that the second coating agent was changed to one which contained 0.5 parts by mass of binder B and 20 parts by mass of the flake graphite having a particle size of 3.5 μm as the solid lubricant.

Example 21

Wiper blade rubbers were obtained by repeating the procedure described in Example 1, except that the second coating agent was changed to one which contained 2 parts by mass of binder B and 13 parts by mass of the flake graphite having a particle size of 3.5 μm as the solid lubricant.

Example 22

Wiper blade rubbers were obtained by repeating the procedure described in Example 1, except that the second coating agent was changed to one which contained 2 parts by mass of binder B and 8 parts by mass of the flake graphite having a particle size of 3.5 μm as the solid lubricant.

Example 23

Wiper blade rubbers were obtained by repeating the procedure described in Example 1, except that the second coating agent was changed to one which contained 5 parts by mass of binder B and 5 parts by mass of the flake graphite having a particle size of 3.5 μm as the solid lubricant.

The second coating layers in Examples 20 to 23 showed a hardness (elastic modulus) of 0.01 MPa, 2 MPa, 3 MPa and 4 MPa, respectively.

Comparative Example 1

Wiper blade rubbers were obtained by repeating the procedure described in Example 1, except that the second coating layer was not provided.

Comparative Example 2

Wiper blade rubbers were obtained by repeating the procedure described in Comparative Example 1, except that the rubber base material was changed to a silicone rubber and that the first coating layer was formed using a coating agent for the silicone rubber.

The wiper blade rubbers of Examples 1 to 23 and Comparative Examples 1 and 2 were subjected to the tests described hereinabove. Tables 1 to 6 show the results.

TABLE 1

| | Examples | | 1 | 2 | 3 | 4 | 5 | 6 | 7 | 8 |
|---|---|---|---|---|---|---|---|---|---|---|
| First coating layer | | Hardness (MPa) | 4 | 4 | 4 | 4 | 4 | 4 | 4 | 4 |
| | | Coated area (%) | 50 | 25 | 70 | 90 | 50 | 50 | 50 | 50 |
| | | Thickness (μm) | 6 | 6 | 6 | 6 | 1 | 2 | 10 | 15 |
| Second coating layer | | Hardness (MPa) | 1 | 1 | 1 | 1 | 1 | 1 | 1 | 1 |
| | | Thickness (μm) | 9 | 9 | 9 | 9 | 9 | 9 | 9 | 9 |
| | Solid lubricant | Type | Flake graphite | Same as left | Same as left | Same as left | Same as left | Same as left | Same as left | Same as left |
| | | Particle size (μm) | 3.5 | 3.5 | 3.5 | 3.5 | 3.5 | 3.5 | 3.5 | 3.5 |
| Wiper blade rubber | Wiping performance (scores) | | 4.5 | 5 | 4 | 3.5 | 4.5 | 4.5 | 4 | 2.5 |
| | Frictional coefficient | Water-repellent glass surface | 0.36 | 0.6 | 0.39 | 0.32 | 0.7 | 0.4 | 0.33 | 0.3 |
| | | Normal glass surface | 0.24 | 0.40 | 0.26 | 0.21 | 0.47 | 0.27 | 0.22 | 0.20 |
| | Durability test (frictional coefficient) | Water-repellent glass surface | 0.61 | 0.86 | 0.6 | 0.55 | 1.01 | 0.75 | 0.6 | 0.55 |
| | | Normal glass surface | 0.45 | 0.63 | 0.44 | 0.41 | 0.75 | 0.55 | 0.44 | 0.41 |
| | Dirt on glass surface | | Absent | Absent | Absent | Absent | Absent | Absent | Absent | Absent |
| | Water repellency on normal glass surface after durability test | | Absent | Absent | Absent | Absent | Absent | Absent | Absent | Absent |

TABLE 2

| | Examples | | 9 | 10 | 11 | 12 | 13 | 14 | 15 |
|---|---|---|---|---|---|---|---|---|---|
| First coating layer | Hardness (MPa) | | 4 | 4 | 4 | 4 | 4 | 4 | 4 |
| | Coated area (%) | | 50 | 50 | 50 | 50 | 50 | 50 | 50 |
| | Thickness ($\mu$m) | | 6 | 6 | 6 | 6 | 6 | 6 | 6 |
| Second coating layer | Hardness (MPa) | | 1 | 1 | 1 | 1 | 1 | 1 | 1 |
| | Thickness ($\mu$m) | | 0.5 | 20 | 9 | 9 | 9 | 9 | 9 |
| | Solid lubricant | Type | Flake graphite | Same as left | Same as left | Same as left | Same as left | Flake molybdenum | Flake PTFE |
| | | Particle size ($\mu$m) | 3.5 | 3.5 | 1 | 10 | 20 | 2 | 8 |
| Wiper blade rubber | Wiping performance (scores) | | 4.5 | 3.5 | 4.5 | 4 | 3 | 4.5 | 4.5 |
| | Frictional coefficient | Water-repellent glass surface | 0.4 | 0.38 | 0.38 | 0.35 | 0.3 | 0.4 | 0.5 |
| | | Normal glass surface | 0.27 | 0.25 | 0.25 | 0.24 | 0.20 | 0.27 | 0.33 |
| | Durability test (frictional coefficient) | Water-repellent glass surface | 0.9 | 0.53 | 0.62 | 0.6 | 0.58 | 0.7 | 0.75 |
| | | Normal glass surface | 0.66 | 0.39 | 0.46 | 0.45 | 0.43 | 0.52 | 0.55 |
| | Dirt on glass surface | | Absent | Present | Absent | Absent | Absent | Absent | Absent |
| | Water repellency on normal glass surface after durability test | | Absent | Absent | Absent | Absent | Absent | Absent | Absent |

TABLE 3

| | Examples | | 16 | 17 | 18 | 19 | 20 | 21 | 22 | 23 |
|---|---|---|---|---|---|---|---|---|---|---|
| First coating layer | Hardness (MPa) | | 1 | 6 | 20 | 25 | 4 | 4 | 4 | 4 |
| | Coated area (%) | | 50 | 50 | 50 | 50 | 50 | 50 | 50 | 50 |
| | Thickness ($\mu$m) | | 6 | 6 | 6 | 6 | 6 | 6 | 6 | 6 |
| Second coating layer | Hardness (MPa) | | 1 | 1 | 1 | 1 | 0.01 | 2 | 3 | 4 |
| | Thickness ($\mu$m) | | 9 | 9 | 9 | 9 | 9 | 9 | 9 | 9 |
| | Solid lubricant | Type | Flake graphite | Same as left | Same as left | Same as left | Same as left | Same as left | Same as left | Same as left |
| | | Particle size ($\mu$m) | 3.5 | 3.5 | 3.5 | 3.5 | 3.5 | 3.5 | 3.5 | 3.5 |
| Wiper blade rubber | Wiping performance (scores) | | 4.5 | 4 | 4 | 2 | 4.5 | 4.5 | 4 | 3 |
| | Frictional coefficient | Water-repellent glass surface | 0.4 | 0.35 | 0.3 | 0.25 | 0.4 | 0.35 | 0.33 | 0.32 |
| | | Normal glass surface | 0.27 | 0.23 | 0.20 | 0.17 | 0.27 | 0.23 | 0.22 | 0.21 |
| | Durability test (frictional coefficient) | Water-repellent glass surface | 0.95 | 0.58 | 0.55 | 0.5 | 0.7 | 0.6 | 0.6 | 0.58 |
| | | Normal glass surface | 0.70 | 0.43 | 0.41 | 0.37 | 0.52 | 0.44 | 0.44 | 0.43 |
| | Dirt on glass surface | | Absent | Absent | Absent | Absent | Absent | Absent | Absent | Absent |
| | Water repellency on normal glass surface after durability test | | Absent | Absent | Absent | Absent | Absent | Absent | Absent | Absent |

TABLE 4

| | | | Example 1 | Comparative Example 1 | Comparative Example 2 |
|---|---|---|---|---|---|
| First coating layer | Hardness (MPa) | | 4 | 4 | 2.7 |
| | Coated area (%) | | 50 | 50 | ca.100 |
| | Thickness ($\mu$m) | | 6 | 6 | 15 |
| Second coating layer | Hardness (MPa) | | 1 | — | — |
| | Thickness ($\mu$m) | | 9 | — | — |
| | Solid lubricant | Type | Flake graphite | — | — |
| | | Particle size ($\mu$m) | 3.5 | — | — |
| Wiper blade rubber | Wiping performance (scores) | | 4.5 | 4 | 4.5 |
| | Frictional coefficient | Water-repellent glass surface | 0.36 | 0.55 | 0.45 |
| | | Normal glass surface | 0.24 | 0.25 | 0.70 |
| | Durability test (frictional coefficient) | Water-repellent glass surface | 0.61 | 0.90 | 0.45 |
| | | Normal glass surface | 0.45 | 0.50 | 0.45 |
| | Dirt on glass surface | | Absent | — | — |
| | Water repellency on normal glass surface after durability test | | Absent | Absent | Present |

TABLE 5

| | First coating layer | | | | | | Second coating layer | | | | | |
|---|---|---|---|---|---|---|---|---|---|---|---|---|
| Examples | Binder | Parts by mass | Solid lubricant | Parts by mass | P/B ratio (by volume) | Film hardness MPa (Martens) | Binder | Parts by mass | Solid lubricant | Parts by mass | P/B ratio (by volume) | Film hardness MPa (Martens) |
| Example1 | a | 2 | Flake graphite | 7 | 1.75 | 4 | b | 1 | Flake graphite(3.5 μm) | 8.5 | 4.25 | 1 |
| Example2~10 | a | 2 | Flake graphite | 7 | 1.75 | 4 | b | 1 | Flake graphite(3.5 μm) | 8.5 | 4.25 | 1 |
| Example11 | a | 2 | Flake graphite | 7 | 1.75 | 4 | b | 1 | Flake graphite(1 μm) | 8.5 | 4.25 | 1 |
| Example12 | a | 2 | Flake graphite | 7 | 1.75 | 4 | b | 1 | Flake graphite(10 μm) | 8.5 | 4.25 | 1 |
| Example13 | a | 2 | Flake graphite | 7 | 1.75 | 4 | b | 1 | Flake graphite(20 μm) | 8.5 | 4.25 | 1 |
| Example14 | a | 2 | Flake graphite | 7 | 1.75 | 4 | b | 1 | Flake molybdenum disulfide(2 μm) | 8.5 | 4.25 | 1 |
| Example15 | a | 2 | Flake graphite | 7 | 1.75 | 4 | b | 1 | Flake PTFE(8 μm) | 8.5 | 4.25 | 1 |
| Example16 | d | 1 | Flake graphite | 8.5 | 4.25 | 1 | b | 1 | Flake graphite(3.5 μm) | 8.5 | 4.25 | 1 |
| Example17 | d | 3 | Flake graphite | 6 | 1 | 6 | b | 1 | Flake graphite(3.5 μm) | 8.5 | 4.25 | 1 |
| Example18 | c | 4 | Flake graphite | 4 | 0.5 | 20 | b | 1 | Flake graphite(3.5 μm) | 8.5 | 4.25 | 1 |
| Example19 | c | 4 | Flake graphite | 2 | 0.25 | 25 | b | 1 | Flake graphite(3.5 μm) | 8.5 | 4.25 | 1 |
| Example20 | a | 2 | Flake graphite | 7 | 1.75 | 4 | b | 0.5 | Flake graphite(3.5 μm) | 20 | 20 | 0.01 |
| Example21 | a | 2 | Flake graphite | 7 | 1.75 | 4 | b | 2 | Flake graphite(3.5 μm) | 13 | 3.25 | 2 |
| Example22 | a | 2 | Flake graphite | 7 | 1.75 | 4 | b | 2 | Flake graphite(3.5 μm) | 8 | 2 | 3 |
| Example23 | a | 2 | Flake graphite | 7 | 1.75 | 4 | b | 5 | Flake graphite(3.5 μm) | 5 | 0.5 | 4 |

PB ratio is the volume ratio of solid lubricant to binder.

TABLE 6

| | Binders |
|---|---|
| a | ETERNACOLL UW-1501-F (manufactured by UBE INDUSTRIES, LTD.) |
| b | ETERNACOLL UW-1005-E (manufactured by UBE INDUSTRIES, LTD.) |
| c | DURANATE E402-B80B (manufactured by Asahi Kasei Corporation) 4.0(wt %) DURANATE 17B-60P (manufactured by Asahi Kasei Corporation) 1.0(wt %) |
| d | NIPPOLAN 179P (manufactured by Nippon Polyurethane Industry Co., Ltd.)4.9(wt %) CORONATE 2513 (manufactured by TOSOH CORPORATION) 6.1 (wt %) |

INDUSTRIAL APPLICABILITY

According to the present invention, wiper blade rubbers useful in industry can be provided which exhibit low friction and high wiping performance with respect to both clean glass surfaces and water-repellent glass surfaces, and which maintain such effects over a long time.

The invention claimed is:

1. A wiper blade rubber comprising:
a rubber base material including a lip portion; and
a coating layer on the lip portion,
wherein the coating layer includes a first coating layer and a second coating layer,
wherein in the lip portion, a part of the first coating layer adheres to a part of the lip portion of the rubber base material,
wherein the second coating layer covers a surface of the first coating layer and adheres to another part of the lip portion of the rubber base material, to which the first coating layer does not adhere, within an area where the first coating layer is formed, and
wherein a ratio of a total area of parts of the lip portion of the rubber base material where the first coating layer adheres to the lip portion, to a total area of parts of the lip portion of the rubber base material where the second coating layer adheres to the lip portion, is in a range of from 30:70 to 80:20.

2. The wiper blade rubber according to claim 1, wherein the second coating layer comprises a solid lubricant and a binder,
wherein the second coating layer is softer than the first coating layer,
wherein the second coating layer itself has an elastic modulus of 0.01 to 3 MPa, and
wherein the first coating layer itself has an elastic modulus of 2 to 20 MPa.

3. The wiper blade rubber according to claim 1, wherein the first coating layer has a thickness of 2 to 10 μm, and the second coating layer has a thickness of 1 to 15 μm.

4. The wiper blade rubber according to claim 3, wherein the second coating layer contains a solid lubricant that is at least one flake solid lubricant selected from the group consisting of flake graphite, flake molybdenum disulfide, flake boron nitride and flake polytetrafluoroethylene.

5. The wiper blade rubber according to claim 4, wherein the flake solid lubricant has a volume-based average particle size (D50) of 1 to 10 μm as determined by a laser diffraction scattering method.

6. The wiper blade rubber according to claim 2, wherein a volume ratio of the solid lubricant to the binder in the second coating layer is in a range of from 1 to 20.

* * * * *